(12) United States Patent
Holmes et al.

(10) Patent No.: US 9,756,194 B1
(45) Date of Patent: Sep. 5, 2017

(54) VIDEO DISPLAY OF A PRINTING DEVICE OUTPUT TRAY

(71) Applicant: KYOCERA Document Solutions Inc., Osaka (JP)

(72) Inventors: Christian Holmes, Oakland, CA (US); Dai Shigenobu, Walnut Creek, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/067,948

(22) Filed: Mar. 11, 2016

(51) Int. Cl.
*H04N 1/00* (2006.01)

(52) U.S. Cl.
CPC ..... *H04N 1/00082* (2013.01); *H04N 1/00037* (2013.01); *H04N 1/00058* (2013.01); *H04N 1/00251* (2013.01); *H04N 2201/0094* (2013.01)

(58) Field of Classification Search
USPC ....................................................... 358/1.15
See application file for complete search history.

(56) References Cited

U.S. PATENT DOCUMENTS

| 7,764,921 | B2 | 7/2010 | Horiguchi et al. | |
|---|---|---|---|---|
| 2003/0202100 | A1* | 10/2003 | Prenn | H04N 7/183 348/155 |
| 2006/0210336 | A1* | 9/2006 | Horiguchi | G03G 15/5016 399/405 |
| 2015/0109438 | A1* | 4/2015 | Matsuda | H04N 5/76 348/143 |
| 2015/0249752 | A1* | 9/2015 | Imai | H04N 1/00042 358/1.15 |

* cited by examiner

*Primary Examiner* — Ngon Nguyen
(74) *Attorney, Agent, or Firm* — McDonnell Boehnen Hulbert & Berghoff LLP

(57) ABSTRACT

Systems and methods for displaying video of an output tray of a printing device are provided. An example method may include a sensor of a printing device detecting motion of a user in an output tray of the printing device. In response to the detected motion, the method may also include activating a video camera of the printing device, wherein the video camera is configured to capture at least an area of the output tray encompassing a reproduced document. Still further, the method may include a display of the printing device displaying live video of the area of the output tray while a user manipulates and retrieves a reproduced document.

19 Claims, 4 Drawing Sheets

VIDEO DISPLAY OF A PRINTING DEVICE OUTPUT TRAY

BACKGROUND

Unless otherwise indicated herein, the materials described in this section are not prior art to the claims in this application and are not admitted to be prior art by inclusion in this section.

Printing devices have increased in both number and complexity as a result of added functions, applications, and services that can be provided. Typically, printing devices are used to reproduce documents, such as by printing or scanning the documents. The reproduced documents are placed in an output tray of a printing device for retrieval.

In some cases, the output tray of the printing device may be partially enclosed, making the reproduced documents difficult to retrieve while standing in front of the printing device. Thus, a need exists for systems and methods to easily retrieve reproduced documents from a printing device output tray.

SUMMARY

In a first aspect, an example method is provided. The method preferably includes detecting, by a sensor of a printing device, motion of a user in an output tray of the printing device. The method also includes activating a video camera of the printing device in response to the detected motion. The video camera is configured to capture at least an area of the output tray encompassing a reproduced document. The method further includes displaying, by a display of the printing device, live video of the area.

In a second aspect, an example printing device is provided. The printing device includes an output tray for receiving a reproduced document, a plurality of sensors arranged to detect motion of a user in the output tray, a video camera configured to capture at least an area of the output tray encompassing the reproduced document, and a display configured to provide live video from the video camera.

In a third aspect, an example user interface for a printing device is provided. The user interface includes a display that is configured to provide live video from a video camera of a printing device. The printing device includes an output tray for receiving a reproduced document, a sensor arranged to detect motion of a user in the output tray, and the video camera that is configured to capture at least an area of an output tray encompassing the reproduced document.

In addition to the aspects, embodiments, and features described above, further aspects, embodiments, and features will become apparent to those of ordinary skill in the art by reading the following detailed description, with reference where appropriate to the accompanying drawings.

DETAILED DESCRIPTION

Figure 1:
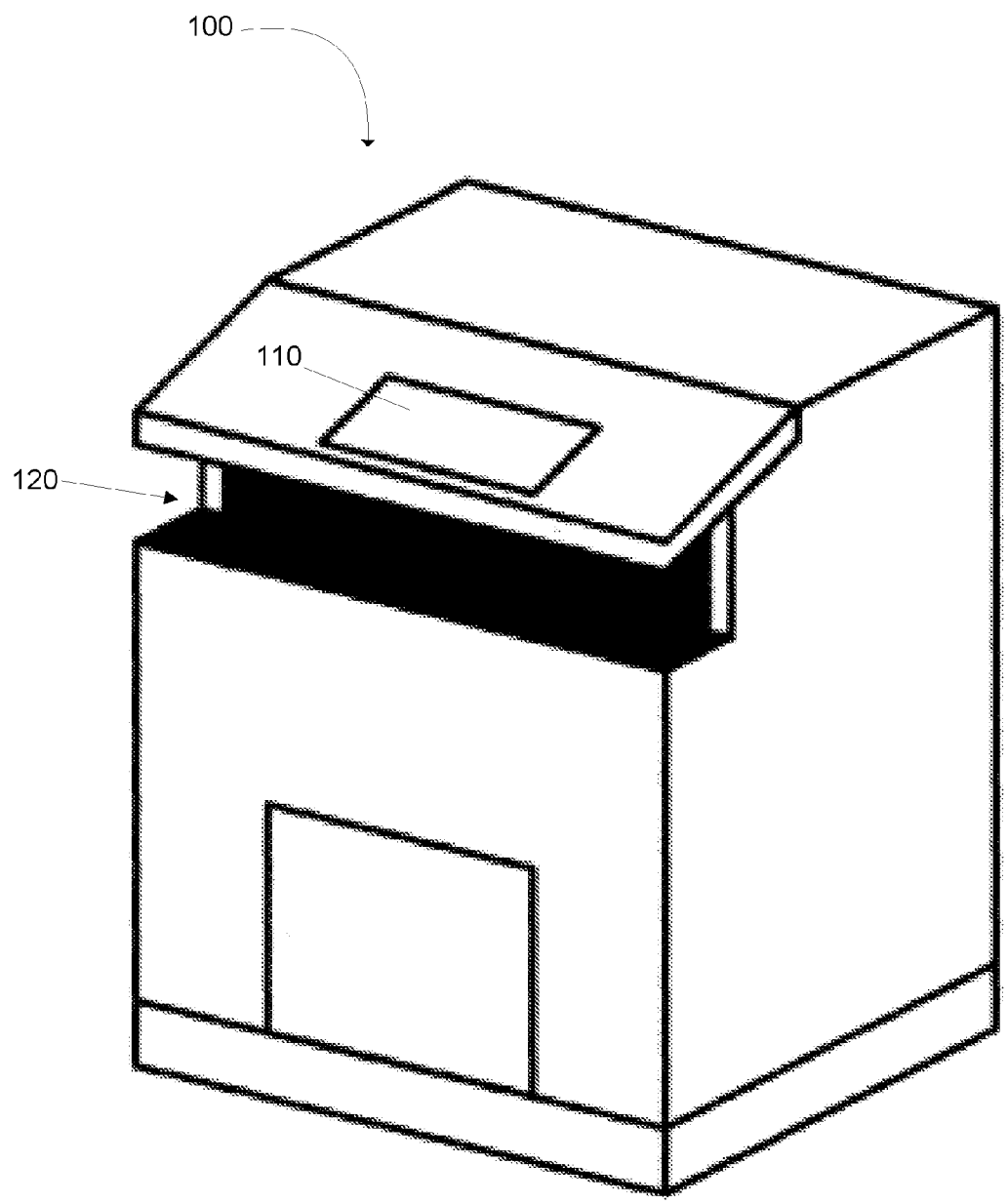
FIG. 1 illustrates an orthogonal view of a printing device, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Various functions described herein as being performed by one or more entities may be carried out by hardware, firmware, or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms.

I. Overview

This application relates to systems and methods for displaying video of an output tray of a printing device. A printing device may be an image forming device capable of reproducing a document such as by scanning, copying, or printing a document. Examples of reproduced documents may include documents that are scanned, copied, or printed, among other documents that may be produced via a printing device.

To easily manipulate and retrieve reproduced documents from the output tray, some embodiments of a printing device may include a sensor to detect motion of a user in the output tray of the printing device. In some embodiments, the sensor may be a reflective infrared sensor that detects motion of a user in the output tray of the printing device. Example motions of a user include hand motion or arm motion when a user tries to manipulate and retrieve reproduced documents from the output tray. Additionally or alternatively, a sensor of the printing device may detect motion when a user's hand is in close proximity to the output tray of the printing device. In some embodiments, a printing device may include more than one sensor. For example, a printing device may include at least one through-beam infrared emitter and a receiver to detect motion in the output tray, or in close proximity to the output tray.

In some embodiments, a printing device may include a video camera. The video camera may include complementary metal-oxide semiconductor (CMOS) image sensors or charge-coupled device (CCD) image sensors. The video camera may be configured to capture at least an area of an output tray encompassing a reproduced document. For example, the video camera may capture an area corresponding to and encompassing newly reproduced documents on the output tray for Letter-size or A4-size paper sheets. In some embodiments, the video camera may be facing the output tray and centered over the output tray to capture at least an area of the output tray encompassing a reproduced document. Additionally or alternatively, the video camera may rotate or swivel to capture different areas within the output tray.

In some embodiments, the video camera may activate or deactivate in response to whether the sensor of the printing device detects motion in the output tray. For example, the video camera may activate and start capturing at least an area encompassing a reproduced document upon detecting a user's hand in the output tray, e.g., attempting to manipulate and retrieve reproduced documents. Upon detecting that the user's hand is no longer in the output tray, the video camera may deactivate and stop capturing the area. In some embodiments, the video camera may be manually activated or deactivated by the user via a user interface.

In some embodiments, a printing device may include a display for displaying live video of at least an area of an output tray captured by the video camera of the printing device. In some embodiments, the display may be part of the printing device, such as the control panel of the printing device. In some embodiments, the display may be a user interface in a remote or separate location from the printing device. For example, the user interface may be a computing device communicating with the printing device via a network interface. The computing device may display live video of an area of the output tray captured by the video camera of the printing device.

In some embodiments, the display may change states in response to whether a sensor of the printing device detects a user's motion. For example, the display may change to indicate that a newly reproduced document is available for retrieval after a user prints or scans a document. In another example, in response to the sensor of the printing device detecting motion in the output tray, the display may change to display a live video feed of an area of the output tray that encompasses the printed or scanned document. The display may, for example, depict a user's hand in the output tray while the user manipulates and retrieves reproduced documents from the output tray. In a further example, in response to the sensor of the printing device no longer detecting motion in the output tray, the display may change to a previous state. Example previous states may include the display changing from displaying a live video feed of the output tray to a menu screen or a home screen.

In some embodiments, a printing device may include one or more illumination devices. In some embodiments, the illumination devices may be light-emitting diodes (LEDs) that project light onto the output tray of a printing device. By projecting light onto the output tray of the printing device, one or more illumination devices may help avoid shadows cast by a user's motion when a user manipulates and retrieves reproduced documents from the output tray.

In some embodiments, the illumination devices may activate or deactivate in response to whether a sensor of the printing device detects a user's motion. For example, the illumination devices may project light onto the output tray when a user's hand is placed in the output tray to manipulate and retrieve reproduced documents. When a user's hand is no longer in the output tray, the illumination devices may deactivate. In some embodiments, the illumination devices may be manually activated or deactivated by the user via a user interface or display of the printing device.

II. Example Systems and Printing Devices

FIG. 1 is an orthogonal view of a printing device 100, according to an example embodiment. In some embodiments, the printing device 100 may include a display 110. The display 110 may be a control panel display of the printing device 100. In some embodiments, the display 110 may display a status of a printing job or a status of the printing device 100. For example, the display 110 may provide a message or an indication that a printing job is complete. Additionally or alternatively, the display 110 may provide an error message or indication associated with a printing job or the printing device 100. Other examples are also possible.

In some embodiments, the display 110 may provide a user interface to allow users to scan, email, or fax documents, or troubleshoot error messages associated with a printing job or the printing device 100. Other options are also possible.

Although display 110 in FIG. 1 is arranged on a top surface of the printing device 100, it should be understood that some embodiments may include a display arranged in other areas. For example, in some embodiments, display 110 may be arranged on either side of printing device 110, or in a front portion of the printing device 100 facing a user that may be standing in front of printing device 100.

In some embodiments, display 110 may be a user interface in a remote location or detached from the printing device 110. An example user interface may include a computing device that has a display and communicates with the printing device via a wired or wireless interface. Generally, it should be understood that one or more functions of display 110 described herein may be performed by a remote computing device individually or in combination with display 110. Further aspects of display 110 are described herein.

In some embodiments, printing device 100 may include an output tray 120. Printing device 100 may print or scan documents and place the reproduced documents in output tray 120. In some embodiments, output tray 120 may be partially enclosed; making printed or scanned documents difficult to retrieve while standing in front of the printing device 100. Although output tray 120 in FIG. 1 is shown as a partially enclosed area in a front portion of the printing device 100, in some embodiments, output tray 120 may be a partially enclosed area on either side of printing device 100.

Figure 2:
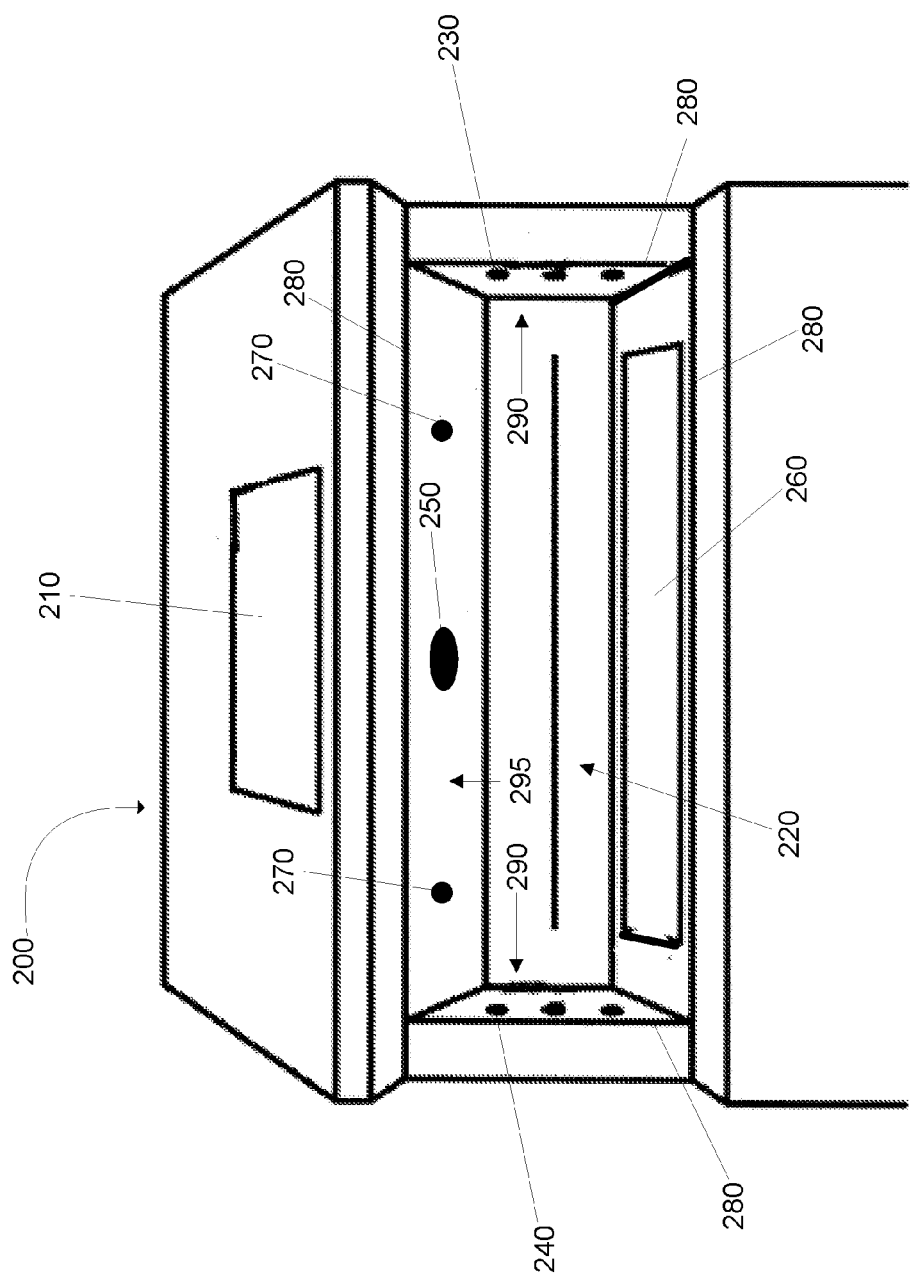
FIG. 2 illustrates a perspective front view into an output tray of a printing device, according to an example embodiment.

FIG. 2 is a perspective front view into a partially enclosed output tray 220 of printing device 200, according to an example embodiment. In some embodiments, to easily manipulate and retrieve scanned or printed documents from output tray 220, printing device 200 may include a sensor 230 to detect a user's motion in output tray 220 of the printing device 200.

In some embodiments, sensor 230 may be a reflective infrared sensor that detects motion of a user in the output tray 220. In some embodiments, sensor 230 may detect a user's hand or arm motion when a user tries to manipulate and retrieve scanned or printed documents from output tray 220. In some embodiments, sensor 230 of printing device 200 may detect a user's motion when a user's hand is in close proximity to the output tray of the printing device. For example, sensor 230 may detect a user's motion when a user's hand or arm is near the edges 280 of output tray 220.

In some embodiments, printing device 200 may include multiple sensors 230, 240. In some embodiments, sensor 230 may be a through-beam infrared emitter and sensor 240 may be a through-beam infrared receiver. In some embodiments, sensors 230, 240 may be reflective infrared sensors. Although sensors 230, 240 in FIG. 2 are shown on the sides 290 of output tray 220, it should be understood that some embodiments of printing device 200 may include sensors arranged anywhere near the front of output tray 220 to detect a user's motion in or in close proximity to output tray 220.

In some embodiments, printing device 200 may include a video camera 250. Video camera 250 may include complementary metal-oxide semiconductor (CMOS) image sensors or charge-coupled device (CCD) image sensors, among other possibilities. In some embodiments video camera 250 may be configured to capture an area 260 of output tray 220 which encompasses a scanned or printed document. For example, video camera 250 may capture an area 260 encompassing Letter-size or A4-size paper documents. In another example, the dimensions of area 260 may be at least 12 inches by 9 inches (30.48 cm by 22.86 cm).

In some embodiments, video camera 250 may be facing output tray 220 and centered over output tray 220 to capture area 260 of output tray 220. In some embodiments, the video camera may rotate or swivel to capture different areas within output tray 220. Other video camera arrangements are possible without departing from the scope of the disclosure herein.

In some embodiments, video camera 250 may activate or deactivate in response to whether a user's motion is detected by sensor 230 and/or 240. In some embodiments, video camera 250 may activate and start capturing area 260 of output tray 220 when a user's hand is placed in output tray 220 or is in close proximity to output tray 220. Video camera 250 may capture the user's motion while the user manipulates and retrieves reproduced documents. In some embodiments, when a user's hand is no longer in output tray 220, the video camera 250 may deactivate and stop capturing area 260. In some embodiments, printing device 200 may be configured to deactivate video camera 250 after a certain amount of time has passed. For example, printing device 200 may deactivate video camera 250 after five minutes. Other time settings are possible and may be configured by the user via display 210. In some embodiments, a user may manually activate or deactivate video camera 250 via display 210 or any other user interface communicating with printing device 200.

In some embodiments, printing device 200 may include one or more illumination devices 270. In some embodiments, illumination devices 270 may be light-emitting diodes (LEDs) that project light onto output tray 220. By projecting light onto output tray 220, illumination devices 270 may help avoid shadows casted by a user's motion when a user manipulates and retrieves reproduced documents in output tray 220.

In some embodiments, the illumination devices may activate or deactivate in response to whether a user's motion is detected by sensor 230 and/or 240. For example, the illumination devices 270 may project light onto output tray 220 when a user's hand is placed in the output tray to manipulate and retrieve reproduced documents. When a user's hand is no longer in the output tray, the illumination devices may deactivate. In some embodiments, printing device 200 may be configured to deactivate illumination devices 270 after a certain amount of time has passed. For example, printing device 200 may deactivate illumination devices 270 after five minutes. Other time settings are possible and may be configured by the user via display 210. In some embodiments, a user may manually activate or deactivate illuminations devices 270 via display 210 or a switch on printing device 200.

Although illumination devices 270 in FIG. 2 are arranged on a top portion 295 of the output tray 220, it should be understood that illumination devices may be arranged in other areas to help avoid shadows casted by user's motion in output tray 220.

In some embodiments, printing device 200 may include display 210 for displaying live video of area 260 of output tray 220 captured by video camera 250. As in display 110 in FIG. 1, display 210 in FIG. 2 may be part of the printing device 200, such as the control panel of the printing device. Alternatively, display 210 may be a user interface in a remote location or detached from printing device 200.

In some embodiments, display 210 may change states in response to whether a user's motion is detected by sensor 230 and/or 240. For example, display 210 may change to indicate that a newly reproduced document is available for retrieval after a user prints or scans a document. In another example, in response to sensor 230 and/or 240 detecting motion in output tray 220, display 210 may change to display a live video feed of area 260 of output tray 220. Display 210 may, for example, depict a user's hand in the output tray while the user manipulates and retrieves reproduced documents from the output tray. In a further example, in response to sensor 230 and/or 240 of printing device 200 no longer detecting motion in output tray 220, display 210 may change to a previous state. Example previous states may include display 210 changing from displaying a live video feed of output tray 220 to a menu screen or a home screen.

In some embodiments, display 210 may remain in the same state when a user retrieves some but not all of the newly reproduced documents that are available for retrieval after the user prints or scans a document. For example, in response to sensor 230 and/or 240 detecting motion in output tray 220 or in response to printing device 200 completing a printing job, display 210 may change to display a live video feed of area 260 of output tray 220. If a user retrieves some but not all of the newly reproduced documents in output tray 220, display 210 may continue to display a live video feed of area 260 of output tray 220 to show the remaining documents to be retrieved.

Figure 3:
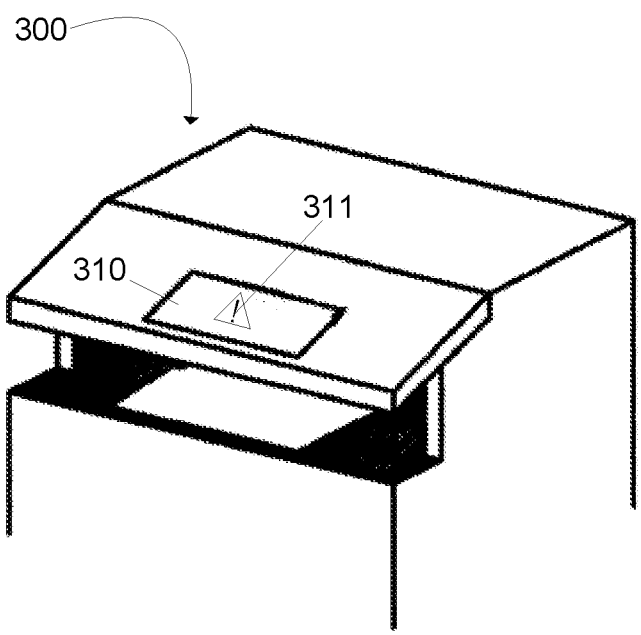
FIG. 3 illustrates a printing device displaying an indication on a display, according to an example embodiment.

FIG. 3 is a printing device 300 displaying an example state of a display 310, according to an example embodiment. Printing device 300, including display 310, may be configured similarly to printing device 200 and display 210 in FIG. 2. In some embodiments, when a printing job is complete and newly reproduced documents are available for retrieval, display 310 may provide an indication 311 to notify a user that a printing job is complete. Indication 311 may be, for example, a message or a symbol indicating that a printing job is complete. Additionally or alternatively, using a video camera such as video camera 250, display 310 may show the newly reproduced documents in the output tray of printing device 300 to indicate that a printing job is complete.

In some embodiments, indication 311 may be an error message associated with a printing job or printing device 300. For example, indication 311 may notify a user of a paper jam. In some embodiments, indication 311 may show the number of remaining pages or documents to be reproduced by printing device 300. In some embodiments, indication 311 may indicate the number of pages or documents reproduced after a printing job is complete. Other example indications are possible flow.

Figure 4:
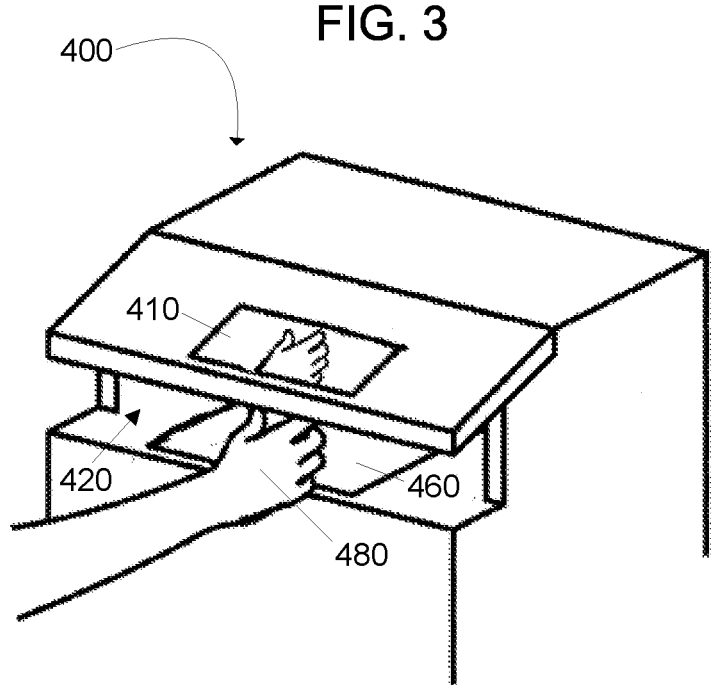
FIG. 4 illustrates a printing device displaying live video on a display, according to an example embodiment.

FIG. 4 is a printing device 400 displaying live video on a display 410, according to an example embodiment. Printing device 400, including display 410, may be configured similarly to printing device 200 and display 210 in FIG. 2. In some embodiments, when a sensor, such as sensor 230 and/or 240 in FIG. 2, detects a user's motion in output tray 420, display 410 may change to show a live video feed of area 460 of output tray 420. Display 410 may depict a user's hand 480 in output tray 420 while the user manipulates and retrieves scanned or printed documents from output tray 420. In some embodiments, when motion is no longer detected in output tray 420, display 410 may change to a previous state. For example, display 410 may change from displaying a live video feed of a user's hand 480 and area 460 in output tray 420 to a menu screen or a home screen. Display 410 may change to other states as well.

III. Example Methods

Figure 5:
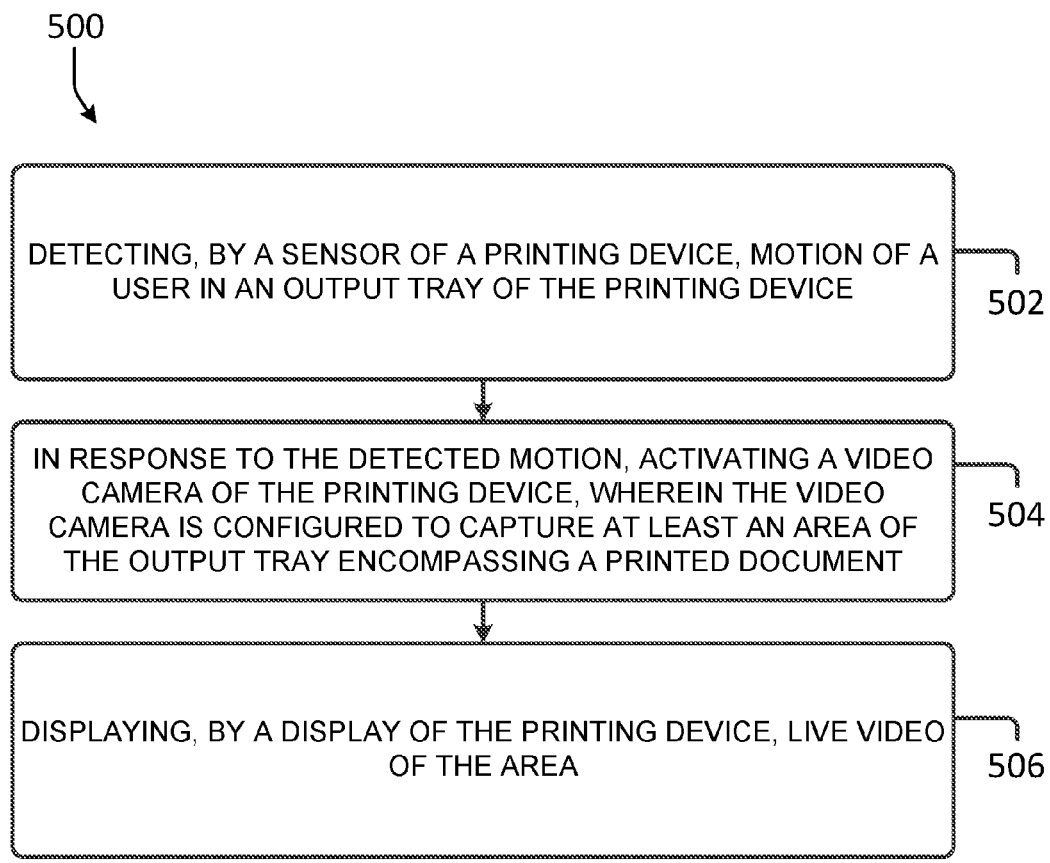
FIG. 5 is a flow chart illustrating an example method according to an embodiment of the present disclosure.

FIG. 5 is a flow chart illustrating method 500, according to an example embodiment that can be implemented with, for example, printing device 100 of FIG. 1, printing device 200 of FIG. 2, printing device 300 of FIG. 3, and/or printing device 400 of FIG. 4. Although FIG. 5 illustrates method 500 as including certain blocks in a particular order, it should be understood that blocks may be added, subtracted, and/or carried out in a different order while remaining within the scope of this disclosure. Furthermore, some or all of the blocks of method 500 may be carried out by printing device 100-400 and/or the various components of printing device 100-400.

Method 500 may include blocks 502-506. At block 502, method 500 may include detecting, by a sensor of a printing device, motion of a user in an output tray of the printing device. In some embodiments, the sensor may be a reflective infrared sensor that detects motion of a user in the output tray of the printing device.

In some embodiments, the sensor may detect a user's hand or arm motion when a user tries to manipulate and retrieve scanned or printed documents from the output tray. In some embodiments, the sensor may detect a user's motion when a user's hand is in close proximity to the output tray of the printing device. For example, the sensor may detect a user's motion when a user's hand or arm is near the edges of the output tray.

In some embodiments, a printing device may include multiple sensors. In some embodiments, the sensors may include a through-beam infrared emitter and a through-beam infrared receiver. In some embodiments, the sensors may include reflective infrared sensors.

At block 504, the method 500 may include, in response to the detected motion, activating a video camera of the printing device, wherein the video camera is configured to capture at least an area of the output tray encompassing a reproduced document. For example, a video camera may activate and start capturing an area of the output tray when a user's hand or arm is placed in the output tray, or is in close proximity to the output tray. The video camera may capture the user's motion while the user manipulates and retrieves printed or scanned documents.

In some embodiments, when a user's hand is no longer in the output tray, the video camera may automatically deactivate and stop capturing the area of the output tray. In some embodiments, a printing device may be configured to deactivate the video camera after a certain amount of time has passed. For example, a printing device may automatically deactivate the video camera after five minutes. Other time settings are possible and may be configured by the user. In some embodiments, a user may manually activate or deactivate the video camera via a display or any other user interface communicating with a printing device.

In some embodiments, one or more illumination devices may automatically activate in response to the detected motion by the sensor. For example, one or more illumination devices may project light onto the output tray of a printing device when a user's hand is placed in the output tray to manipulate and retrieve printed or scanned documents.

In some embodiments, one or more illumination devices may deactivate in response to the sensor no longer detecting motion in the output tray. For example, one or more illumination devices may turn off after a user retrieves printed or scanned documents form the output tray of a printing device. In some embodiments, one or more illumination devices may deactivate after a certain amount of time has passed. For example, one or more illumination devices may deactivate five minutes after a printing job is complete or after the scanned or printed documents have been retrieved. Other time settings are possible and may be configured by the user via a display. In some embodiments, a user may manually activate or deactivate one or more illuminations devices.

At block 506, method 500 may include displaying, by a display of the printing device, live video of the area of the output tray. In some embodiments, the area of the output tray may encompass a scanned or printed document. For example, the area may encompass Letter-size or A4-size paper documents. In another example, the dimensions of the area may be at least 12 inches by 9 inches (30.48 cm by 22.86 cm).

In some embodiments, the display of the printing device may change states in response to whether a user's motion is detected by the sensor of the printing device. For example, when a user prints or scans a document, the display of a printing device may indicate that a newly reproduced document is available for retrieval. When the user tries to manipulate and retrieve the newly reproduced document from the output tray of the printing device, the display of the printing device may change to display a live video feed of the area of the output tray and the depicted motion of the user.

In some embodiments, in response to the sensor of printing device no longer detecting motion in the output tray, the display may change to a previous state. Example previous states may include the display changing from displaying a live video feed of output tray to a menu screen or a home screen.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the diagrams, examples, and flow charts in the figures and as discussed herein, each block and/or connection may represent a processing of information and/or a transmission of information in accordance with example embodiments. Alternative embodiments may be included within the scope of such example embodiments. Further, more or fewer blocks and/or functions may be used with any of the diagrams, examples, and flow charts discussed herein, and these diagrams, examples, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting with the true scope and spirit being indicated by the following claims.

What is claimed is:

1. A method, comprising:
   detecting, by a sensor of a printing device, motion of a user in a paper discharging portion of the printing device, wherein the printing device comprises the paper discharging portion configured to discharge a reproduced document, a control panel including a display unit, and a video camera configured to capture an image of the paper discharging portion, wherein the control panel at least partially overlays the paper discharging portion, and wherein at least a portion of the video camera is located substantially between the control panel and the paper discharging portion;
   in response to the sensor detecting motion, activating the video camera of the printing device, wherein the video camera is configured to capture at least an area of the paper discharging portion encompassing the reproduced document, wherein the area corresponds to the part of the paper discharging portion that is overlain by the control panel; and
   displaying, by the display unit of the control panel, live video of the area to thereby display, in real-time, the motion of the user in the paper discharging portion.

2. The method of claim 1, further comprising:
   before detecting the motion of the user, delivering, by the printing device, the reproduced document to the paper discharging portion of the printing device.

3. The method of claim 1, wherein displaying live video of the area comprises displaying, by the display unit, the reproduced document.

4. The method of claim 1, further comprising:
   when motion is no longer detected, deactivating the video camera.

5. The method of claim 1, further comprising:
   when motion is no longer detected, displaying, by the display unit, a previous state of the display, wherein the previous state does not include live video.

6. The method of claim 1, wherein the printing device comprises a plurality of sensors, the plurality of sensors comprising a through-beam infrared emitter and a receiver.

7. The method of claim 6, wherein the plurality of emitters and the plurality of receivers are aligned so that the through-beam emitted from each of the emitters is received by each of the receivers.

8. The method of claim 1, further comprising:
   in response to the detected motion, activating a plurality of illumination devices of the printing device to project light to the paper discharging portion; and
   deactivating the plurality of illumination devices when the motion is no longer detected.

9. The method of claim 8, wherein the plurality of illumination devices comprises light-emitting diodes (LEDs).

10. A printing device, comprising:
    a paper discharging portion for receiving a reproduced document;
    a control panel including a display unit, wherein the control panel at least partially overlays the paper discharging portion;
    a plurality of sensors arranged to detect motion of a user in the paper discharging portion; and
    a video camera configured to capture at least an area of the paper discharging portion encompassing the reproduced document, wherein the video camera is located substantially between the control panel and the paper discharging portion,
    wherein the display unit is configured to provide live video of the area, from the video camera to thereby display, in real time, the motion of the user in the paper discharging portion.

11. The printing device of claim 10, wherein the display unit is further configured to return to a previous state when the motion is no longer detected by the plurality of sensors, wherein the previous state does not include live video.

12. The printing device of claim 10, wherein the plurality of sensors comprise a through-beam infrared emitter and a receiver.

13. The printing device of claim 10, further comprising:
    a plurality of illumination devices arranged on the printing device, wherein the plurality of illumination devices is configured to project light to the paper discharging portion when the motion is detected in the paper discharging portion.

14. The printing device of claim 13, wherein the plurality of illumination devices is further configured to deactivate when the motion is no longer detected in the paper discharging portion.

15. The printing device of claim 10, wherein the video camera is further configured to capture video when the plurality of sensors detect the motion in the paper discharging portion.

16. A user interface for a printing device, comprising:
- a display unit configured to provide live video from a video camera of the printing device wherein the video camera is substantially located on an underside of a control panel of the printing device, wherein the printing device comprises:
- a paper discharging portion for receiving a reproduced document;
- a sensor arranged to detect motion of a user in the paper discharging portion; and
- the video camera, which is configured to capture at least an area of the paper discharging portion encompassing the reproduced document.

17. The user interface of claim 16, wherein the video camera is further configured to capture video when the sensor detects the motion in the paper discharging portion.

18. The user interface of claim 16, wherein the display unit is further configured to return to a previous state when the motion is no longer detected by the sensor, wherein the previous state does not include live video.

19. The user interface of claim 16, wherein the printing device further comprises:
- a plurality of illumination devices arranged on the printing device, wherein the plurality of illumination devices is configured to project light to the paper discharging portion when motion is detected in the paper discharging portion.

* * * * *